United States Patent [19]

Henderson

[11] Patent Number: 4,839,197
[45] Date of Patent: Jun. 13, 1989

[54] PROCESS FOR FABRICATING THIN FILM MAGNETIC RECORDING HEADS HAVING PRECISION CONTROL OF THE WIDTH TOLERANCE OF THE UPPER POLE TIP

[75] Inventor: Watson R. Henderson, Broomfield, Colo.

[73] Assignee: Storage Technology Corporation, Louisville, Colo.

[21] Appl. No.: 181,208

[22] Filed: Apr. 13, 1988

[51] Int. Cl.[4] .......................... G11B 5/42; B05D 5/12
[52] U.S. Cl. ..................................... 427/116; 29/603; 427/131; 360/119
[58] Field of Search .................. 29/603; 427/116, 128, 427/131; 360/119-121, 125, 127

[56] References Cited

U.S. PATENT DOCUMENTS

| | | | |
|---|---|---|---|
| 4,190,872 | 2/1980 | Jones, Jr. et al. | 360/125 |
| 4,242,710 | 12/1980 | Hempstead et al. | 360/113 |
| 4,511,942 | 4/1985 | Valstyn | 360/126 |
| 4,546,541 | 10/1985 | Reid | 29/603 |
| 4,589,042 | 5/1986 | Anderson et al. | 360/125 |
| 4,652,954 | 3/1987 | Church | 360/120 |
| 4,689,877 | 9/1987 | Church | 29/603 |

Primary Examiner—Carl E. Hall
Attorney, Agent, or Firm—Dorr, Carson, Sloan & Peterson

[57] ABSTRACT

A process for fabricating a thin film magnetic head to achieve improved dimensions and tolerances of the pole tip portion of the head. A lower thin film magnetic layer comprising the lower pole tip is first formed followed by a thin layer defining the gap of the head. A thin film magnetic layer is then deposited only in the vicinity of the pole tip to define the upper pole of the head. Following this, successive layers of insulation and coils are deposited. Finally, a top thin film magnetic layer is deposited. This top layer contacts the already formed layer comprising the top pole piece.

12 Claims, 2 Drawing Sheets

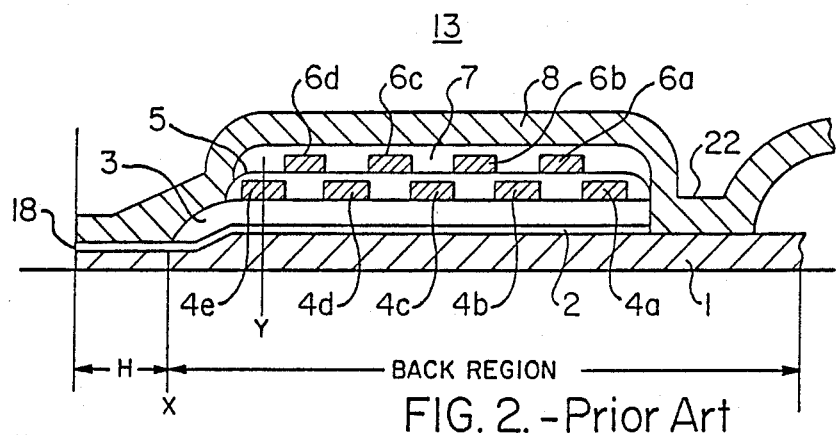
FIG. 2.-Prior Art
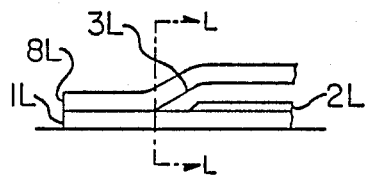
FIG. 3.-Prior Art
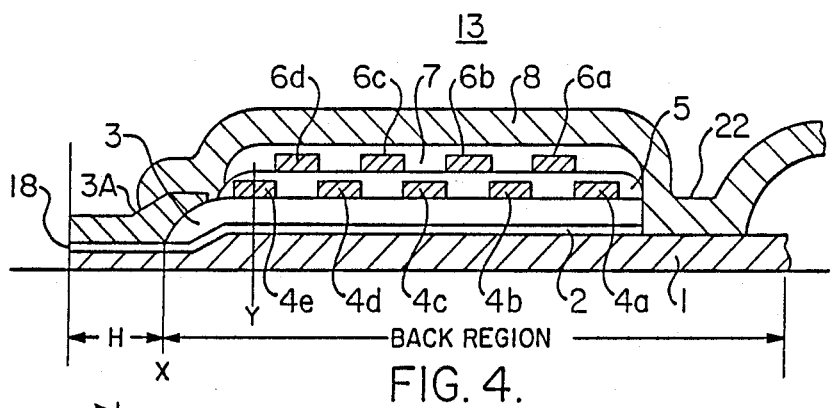
FIG. 4.
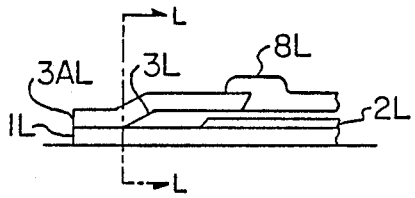
FIG. 5.

PROCESS FOR FABRICATING THIN FILM MAGNETIC RECORDING HEADS HAVING PRECISION CONTROL OF THE WIDTH TOLERANCE OF THE UPPER POLE TIP

FIELD OF THE INVENTION

This invention relates to a process for fabricating thin film magnetic heads assemblies and, in particular, to a process having an improved control of the width tolerance of the upper pole tip dimensions of the heads.

BACKGROUND OF THE INVENTION

In magnetic recording technology it is constantly desired to improve the areal density at which information can be recorded and reliably read. This desire has lead a trend toward shrinking track widths and greater bit density along a magnetic recording track.

One of the important parameters which determine the performance of a magnetic head is the gap length. The gap length is defined by the separation of two magnetic pole pieces at the transducing gap. The separation of the pole pieces is usually established by a gap forming layer of non-magnetic material. A second important parameter affecting performance of a magnetic head is the width of the pole tips. This dimension can be less than ten microns and must be closely controlled in order to achieve optimum performance. A third important parameter which determines the performance of a magnetic head is the throat-.height. This parameter is measured from the pole tip face to a so-called zero throat point which is the point at which the upper and lower magnetic pole pieces begin to diverge in order to enclose the coil.

Magnetic heads are currently made by using thin film photolithographic technology. This technology permits the fabrication of heads having much smaller transducing gaps than the arrangements priorly used. U.S. Pat. Nos. 4,190,872, 4,589,042 and 4,652,954 disclose magnetic heads fabricated with the use of thin film photolithographic technology. This technique successfully deposits a number of films on a substrate during head fabrication. The magnetic structure of the heads comprises a pair of magnetic films separated by layers of insulating films and by one or more layers having turns of conductive material. These turns comprise the windings of the head and they perform the reading and writing functions of the head. The pair of magnetic films comprises a lower film and an upper film which together comprise the magnetic head structure. The magnetic structure includes a main body portion and a pole piece portion.

The trend toward increased areal densities requires narrower pole tips and shorter throat heights. It has heretofore been difficult to fabricate devices that consistently meet these requirements. One important reason for this is that the upper magnetic film layer is typically photographically defined and deposited after the layers comprising the coil structure have been deposited. This coil structure is relatively thick and is approximately three to five times the thickness of the pole pieces. Since the upper pole piece layer must cover the relatively thick coil structure that has already been built up, it is difficult to deposit a layer of photo defining material that is thin in the area of the pole tips and, at the same time, covers the coil structure with optimum depth to provide precise definition to both areas. Because of this difficulty, a plurality of units produced during a production run of these devices will yield relatively few heads having the required narrow pole tips and short throat heights. The remainder of the production run will comprise devices that do not meet these requirements.

U.S. Pat. No. 4,190,872 attempts to solve this problem by depositing the layer comprising the upper pole piece in two stages using an appropriate mask for each stage so that the thickness of the upper layer in the back region is greater than in the pole tip region. See column 2, lines 63 through 65 of this patent. U.S. Pat. No. 4,589,042 also fabricates the upper magnetic layer in two separate steps. A pole piece area 24 of the upper layer is first fabricated followed by a fabrication of the back region portion of the upper layer. See columns 3 and 4 of this patent. Although the fabrication of the upper layer in two separate steps is an improvement over the prior art arrangements which deposit the upper layer in a single step, the upper pole tips produced by the methods of these patents are not consistently of the ideal dimensions since the upper pole tip layer is fabricated near the end of the process after the insulating layers and the layers comprising the coil structure are deposited.

It may be seen from above, that it is a problem to produce thin film heads by photolithographic techniques whereby the heads have narrow pole tips and the required width tolerances.

BRIEF DESCRIPTION OF THE INVENTION

This invention solves the above problem by providing a process for producing thin film magnetic heads which have the narrow pole tip width and short throat heights required to achieve high areal recording densities. The heads are made by a sequence of photolithographic operations comprising defined deposition and etching steps. This includes the deposition of a lower magnetic film on a bare substrate followed by layers of insulation and layers containing the coils. As priorly mentioned, it has heretofore been difficult to define pole pieces that are narrow in width and have short throat heights. This problem exists since the operation in which the top magnetic film layer is deposited must deposit a thick photo defining layer in order to cover the relatively thick coil structure at the back portion of the device and, at the pole tip end of the device, this same operation would preferably deposit a relatively thin layer that defines the upper pole tip. This is difficult to achieve with any degree of consistency by the currently known techniques in the photolithographic art when the entirety of the top magnetic film layer is formed by the same operation.

The present invention is an improvement over the above discussed prior art process in that the upper top pole tip is defined in a separate operation following the deposition of the bottom magnetic film layer, and the gap layer, and the first planer insulation layer. The bottom magnetic film layer is first formed with one end of this layer comprising the lower pole tip. An insulating gap layer is next formed with holes defined through this layer to allow electrical and magnetic connections. A second insulating first planer layer is then deposited. Following this, the upper pole tip is defined as an added step in relation to the prior art. Photoresist is used to define only an upper pole tip and the upper electrical contact tip portion of an associated lapping guide that has the required narrow width and close registration tolerances. Following this, successive layers of coils and insulation are added. Finally a top magnetic film layer is added. This top layer covers the coil structure and only a back end portion of the top pole piece layer that was priorly deposited. Fabrication tolerances for this portion of the magnetic structure are much less demanding than those for the tip region. Difficulties related to the thick photoresist layer required to cover the built up coil assembly impact the device fabrication to a lesser degree because of the larger dimensional tolerance of the upper pole body.

The method of the present invention is advantageous in that the top pole tip is defined before the coil structure is fabricated. The photoresist thickness of the defining layer for the upper pole tip is optimized to allow a far more accurate fabrication of the pole piece area than is possible with the prior art arrangements. A lapping guide is produced at the same time as the head, as is conventional in the prior art. The top electrical contact tip of the lapping guide is formed by the added step of the present invention early in the process to cover the gap layer and the tip edge of the first planar layer. Covering the gap and first planar regions prevents processes associated with fabrication of the coil and coil insulation structure from reducing the thickness of the gap layer or eroding the tip edge of the first planar layer of the head or guide. Prevention of such erosion reduces the chance that registration accuracy between the tip edge of the first planar layer in the head and the tip edge of the first planar layer in the lap guide will be lost. This provides an improved accuracy in the lapping operation in which the throat height is defined.

It may be seen that the process of the present invention provides for a more efficient production of thin film heads having the required dimensions of the pole tip faces by providing better control of the gap thickness and provides enhanced registration accuracy for the lapping guides.

BRIEF DESCRIPTION OF THE DRAWING

The invention may be better understood from a reading of the following description thereof taken in conjunction with the drawing in which

FIG. 2 comprises a cross sectional view of a thin film head produced by prior art processes;

FIG. 3 comprises a cross sectional view of a lapping guide produced by prior art processes;

FIG. 4 comprises a cross sectional view of a thin film head produced by the process of the present invention;

FIG. 5 comprises a cross sectional view of a lapping guide produced by the process of the present invention.

DETAILED DESCRIPTION

Figure 1:
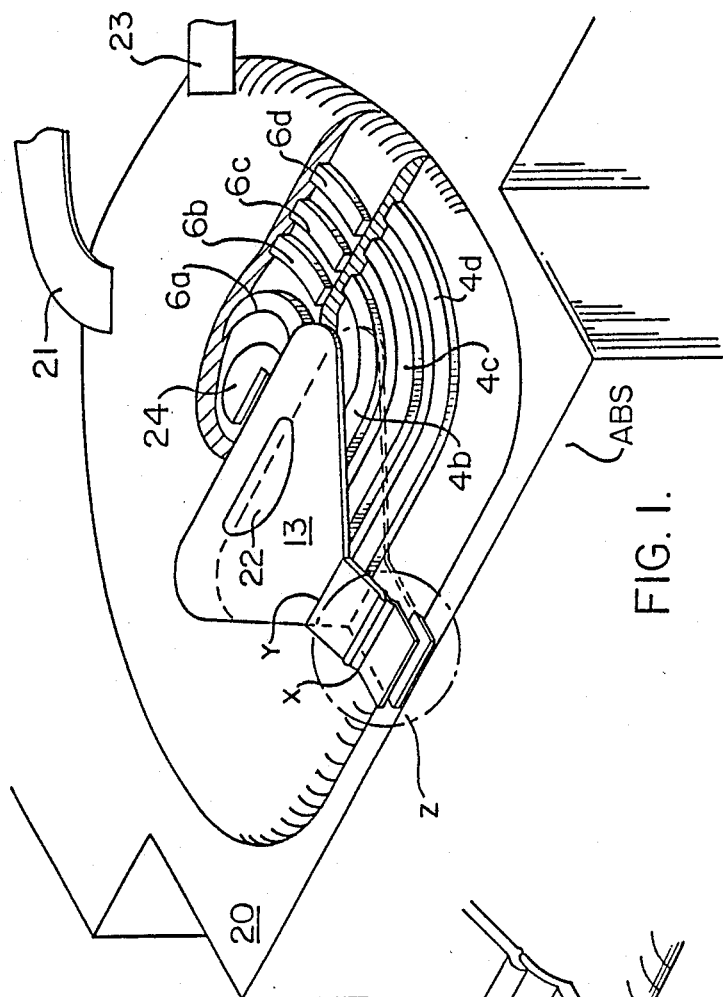
FIG. 1 is an enlarged perspective view, partially broken away, of a thin film transducer embodying the invention.

As illustrated in the drawings, the thin film head produced by the process of the present invention comprises an upper conductor coil having a plurality of turns 6a, 6b, etc. plated in a spiral pattern between insulating layers 7 and 5. The head also includes a lower coil plated in a spiral pattern between insulating layers 5 and 3 and having a plurality of turns 4a, 4b, etc. The number of turns in each coil layer is determined by the required electrical characteristics of the head. An end of the outermost turn of the lower winding is connected to tab 23 on FIG. 1. The innermost turn 4a of the lower winding is connected to a via 24 on FIG. 1. The innermost turn 6a of the upper winding is also connected to via 24. The end of the outermost turn of the upper winding is connected to tab 21 on FIG. 1. Thus, the two windings are internally connected in series and the series circuit is connected to tabs 21 and 23 for connection to the electronic circuitry with which the head communicates.

The magnetic yoke structure 13 of the present invention comprises a pole tip region having a throat height of H as shown on FIG. 4 and a back region immediately to the right of the pole tip region. The yoke structure 13 further comprises a lower layer 1 and an upper layer 8 (FIG. 4) of magnetic material such as permalloy. The magnetic layers 1 and 8 are separated by at least one insulating layer 2 except at the right end of the back region where they make magnetic contact. At the pole tip region they are separated only by the insulating gap layer 2. Layer 2 forms a transducing gap between the lower pole piece 1 and the upper pole piece 8 in the pole tip region. The outer (left) end of the transducing gap 18 (FIG. 4) coincides with an air bearing surface (ABS) of a magnetic ceramic slider 20 (FIG. 1) on which the above described layers are deposited. Transducer gap 18 interacts in an air bearing relationship with a magnetic recording medium (not shown) such as a rotable disk or a tape when the disk or tape move past gap 18 and while closely adjacent the ABS.

The following describes the prior art process used to fabricate the head of FIG. 2 and the lapping guide of FIG. 3. Magnetic layer 1 and magnetic layer 1L are deposited on slider 20 using appropriate masks to achieve a deposit of reduced thickness for the lower pole piece in the pole tip region H. Layers 2 and 2L, respectively, of aluminum oxide are then formed and deposited over layer 1 of the head of FIG. 2 and over layer 1L of the lapping guide of FIG. 3, respectively. An opening is etched through layer 2 (or deposition is restricted) in the back region area 22 of the head to allow the required magnetic connection between layers 8 and 1. An opening is also etched (or deposition is restricted) in the electrical contact tip region of the lapping guide (left hand portion of FIG. 3) through layer 2L to allow the required electrical connection between the left portion of layers 1L and 3AL. This opening in layer 2L begins immediately to the left extremity of layer 2L shown on FIG. 3. Insulating layer 3 is then deposited. The spiraling turns 4a, 4b, 4c, etc. of the lower coil are deposited on insulating layer 3. Insulating layer 5 is next deposited over the coil 4. Spiraling turns 6a through 6d of upper coil 6 are deposited on the insulating layer 5. Then, insulating layer 7 is deposited over coil 6. Following that, the top magnetic layer 8 is deposited over the insulating layer 7 except at the back gap portion 22 where layer 8 makes magnetic contact with the bottom magnetic layer 1.

Figure 6:
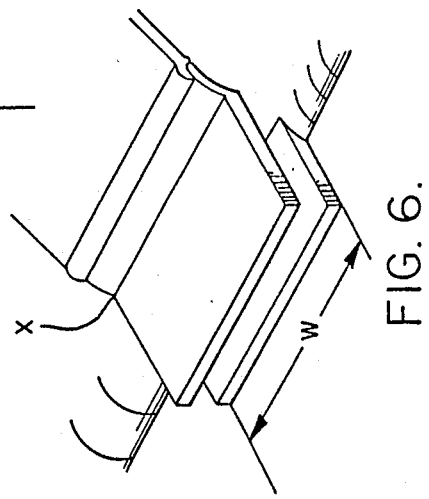
FIG. 6 is an enlargement of the pole tip structure within the circle Z on FIG. 1.

Pole tip region H has a preselected substantially constant width W (FIG. 6) which is equal to or slightly less than the width of a track on an associated magnetic medium with which the pole tip cooperates. This pole tip region extends a relatively short distance H normal to the magnetic medium to achieve a maximum of transitions during reading. The pole tip region consist of a pole tip that extends from the ABS surface to the zero throat line X (FIG. 2) and a pole tip extension that extends from line X to an optimum transition line Y. Between lines X and Y, which is where the magnetic layers 1 and 8 contact the coil insulating layers 3, 5 and 7, magnetic layer 8 progresses and diverges progressively from the plane of slider 20. Note that the turned down outer left edges of the insulating layers 3, 5 and 7 are caused by some flow of the material during deposition which results in layer 8 having a somewhat curved cross section; but pole tip region H nevertheless preferably is maintained substantially constant at width W on FIG. 1 between line X and the ABS.

A lapping guide associated with the substrate of FIG. 2 is shown on FIG. 3. The lapping guide on FIG. 3 has layers that correspond to the substrate layers of FIG. 2. The layers that correspond to each other on FIGS. 2 and 3 are designated in a manner to facilitate the correspondence. This is done by designating each element on FIG. 3 with the same number as its corresponding element on FIG. 2 except that each element of FIG. 3 additionally has an "L" suffix. For example, layer 1L of the lapping guide of FIG. 3 corresponds to layer 1 of the substrate of FIG. 2. The head of FIG. 2 and the lapping guide of FIG. 3 are formed on the same substrate. Therefore layer 1 of FIG. 3 is deposited at the same time that layer 1 of FIG. 2 is deposited. The same correspondence applies with regard to the other numbered layers on FIGS. 2 and 3. The corresponding layers on each figure are deposited at the same time since the recording head of FIG. 2 and the lapping guide of FIG. 3 are on the same substrate.

In accordance with well known techniques, the lapping guide is ground down to the left of line L-L of FIG. 3 until an electrical connection between layer 8L and layer 1L is broken. At the time the connection between layer 8L and layer 1L is broken, the lapping operation is terminated. The throat height H is thus accurately defined for the head of FIG. 2 since the excess portion that was priorly to the left of portion H on FIG. 2 was ground down in the same operation in which the lapping guide of FIG. 3 was ground.

FIG. 4 shows a thin film head produced in accordance with the process of the present invention. FIG. 5 shows the lapping guide that is on the same substrate and that is formed at the same time that the head of FIG. 4 is formed. The following describes the process used to fabricate the head of FIG. 4 and the lapping guide of FIG. 5. Layer 1 containing the bottom pole of the head and the lower electrode 1L of the lapping guide is first formed. These components may be formed of electroplated nickel-iron alloy. Layers 2 and 2L respectively of aluminum oxide are then formed and deposited over layer 1 on the head of FIG. 4 and over 1L of the lapping guide of FIG. 5 respectively. An opening is etched (or deposition of layer 2 is restricted) through layer 2 in the back region area 22 of the head to allow the required magnetic connection between layers 8 and 1. An opening is also etched (or deposition is restricted) in the electrical contact tip region of the lapping guide (left hand portion of layer 1L of FIG. 5) through layer 2L to allow the required electrical connection between layers 1L and 3AL. This opening begins immediately at the left extremity of layer 2L of FIG. 5. A first planarization layer 3 is then added as an insulation layer on the structures of FIGS. 4 and a corresponding layer 3L is added to the lapping guide of FIG. 5.

The next components added after the first planarization layer 3 are the upper top pole tip 3A on FIG. 4 and the top electrical contact tip 3AL on the lapping guide of FIG. 5. This change in sequence over the prior art provides three advantages. First, the top pole tip 3A is defined before the coil structure is in place next to the tip. In the prior art, the coil structure must be covered with enough photoresist to allow definition of the top pole over the top of the coils. Since the height of the coil structure is several times the height of the upper pole tip layer 3A, the photoresist will be forced by capillary tension during its coating process to be much thicker than is required. It will also be very non-uniform in thickness in the pole tip region next to the coil structure. Photoresist that is too thick for requirements is nonuniform in thickness and it prevents optimum definition of a feature. Pole tip width W is a critical dimension of a thin film magnetic head since it is directly related to the width of the track that is written and read. In this invention, definition for the pole tip takes place before the coil structure is produced. Photoresist thickness is optimized for the upper pole tip area 3A to allow a much better definition. Tests have indicated that at least a factor of two improvement in the variation in the final width of the plated tip dimension. Registration errors with respect to the bottom pole are also reduced with respect to the thickness of the photoresist present during the alignment of the photoprinting operation.

A second advantage comes from the change in the sequence in which the upper lapping guide electrode 3AL is formed. It should be noticed that the top electrical contact tip 3AL of the lapping guide is formed at the same time as the top pole tip 3A. Registration between the edge of the resist of the first planer layer 3, which is under the pole tip, and the corresponding edge of the insulating layer 3L of the lapping guide provides the positional reference used in lapping of the air bearing surface. This lapping operation accurately establishes the throat height. Throat height is critical in determining parametrics of the head and should be controlled at the accuracy of the order of a fraction of a micron. In the prior art, these critical edges are exposed to the additional definition and etching operations associated with the formation of the coils as compared to the method of this invention. If any nonuniformity in these operations causes the edges of the lapping guide insulating layer 3L to be etched back more than the edge of the first planer layer 3 of the head, then the relative positioning accuracy will be reduced.

A third advantage is an improvement in the control of the alloy content of the pole tip. Differences in size, shape and vertical changes in height of the substrate for a defined feature can adversely effect control of alloy content of this feature. In this invention, the top pole tip 3A and the upper lapping guide electrode 3AL is the only structure defined at this operation. Only the alloy content of the tip 3A is critical to the head performance. The alloy content of the tip does not need to be controlled along with that of the body as in the case of the prior art. Because of the area of the tip is much smaller than the tip plus the body, and because the tip alone is more nearly coplaner than the tip plus the body, the alloy content of this top pole tip can be more accurately controlled by use of the process of this invention.

The rest of the device of FIG. 4 and 5 is then formed sequentially by processes similar to the prior art. These are the layers 4, 5, 6 and 7. Specifically, after layer 3A is deposited, coil 4 and insulating layer 5, and coil 6 and insulating layer 7 are then deposited in that order. Finally, the top pole body 8 and the remainder of the top electrode 8L of the lapping guide are added to the assembly. From that point onward, the process follows the prior art.

While a specific embodiment of this invention has been disclosed herein, it is expected that those skilled in the art can design other embodiments that differ from this particular embodiment but all within the scope of the appended claims.

I claim:

1. A method of making a thin film head, said method comprising the steps of:

depositing a first layer of, magnetic material on a substrate to form a bottom pole piece comprising a front pole tip area and a back region area having a back gap portion, depositing a gap forming layer of nonmagnetic material over said first layer, depositing only in said front pole tip area a thin film magnetic layer on top of said gap forming layer to define an upper pole tip of said head, depositing at least one layer containing coils over the portion of said gap forming layer not covered by said upper pole tip, depositing at least one insulation layer over said coil layer, and depositing over said one insulation layer an upper thin film layer of magnetic material to define an upper magnetic structure of said head said last mentioned layer contacting said upper pole tip only at an end of said upper pole tip adjacent said back area of said head.

2. The method of claim 1 in combination with the step of;

depositing a planarization layer onto the back region area of said gap forming layer prior to depositing said upper pole tip layer and said coil layer.

3. The method of claim 2 in combination with the step of:

forming an opening in said back gap portion of said gap forming layer of said head to allow a magnetic connection between said first layer and said upper magnetic structure, and depositing said upper magnetic layer onto said opening whereby said first and said upper magnetic layers contact each other.

4. The method of claim 2 whereby a lapping guide is formed on the said substrate concurrently with said head with said lapping guide having:

a lower electrical contact tip corresponding to said first layer of said head, a gap forming layer corresponding to said gap forming layer in said back region are of said head, a planarization layer corresponding to said planarization layer of the said head which is formed concurrently with that of said head and using a single masking step so that a registration inaccuracy cannot cause relative mispositioning of a tip edge of said planarization layer of said head and said guide, and an upper electrical contact tip corresponding to said upper pole tip of said head, all of said layers and said lower contact tip and said upper contact tip of said guide being in exact registration with and being formed concurrently with the corresponding elements of said head.

5. The method of claim 1 wherein said first layer comprises electroplated nickel-iron alloy.

6. The method of claim 1 wherein said gap forming layer comprises aluminum oxide.

7. A method of making a thin film magnetic head, said method comprising the steps of:

depositing a first layer of magnetic material onto a substrate to form a bottom pole piece comprising a front pole tip area and a back region area having a back gap portion, depositing a gap forming layer of nonmagnetic material over said first layer, depositing a planarization layer over the back region area of said gap forming layer, depositing only in said front pole tip area a thin film magnetic layer on top of said gap forming layer to define an upper pole tip of said head, depositing a first layer containing coils over said planarization layer, depositing a first insulation layer over said first coil layer, depositing a second layer containing coils over said first insulation layer, depositing a second insulation layer over said second coil layer, and depositing over said second insulation layer an upper thin film layer of magnetic material to define the upper magnetic structure of said head, said last mentioned layer contacting said upper pole tip only in the end of said upper pole tip adjacent said back area of said head.

8. The method of claim 7 in combination with the steps of:

forming an opening in said back gap portion of said gap forming layer to allow magnetic connection between said first layer and said upper magnetic structure, and depositing said upper magnetic layer onto said opening whereby said first layer and said upper magnetic structure contact each other.

9. The method of claim 8 whereby a lapping guide is formed on said substrate concurrently with said head with said lapping guide having:

a lower electrical contact tip corresponding to said lower pole piece of said head, a gap forming layer corresponding to said gap forming layer in said back region area of said head, a planarization layer corresponding to said planarization layer of said head which is formed concurrently with that of said head and using a single masking step so that a registration inaccuracy cannot cause relative mispositioning of a tip edge of said planarization layer of said head and said guide, and an upper electrical contact tip corresponding to said upper pole tip of said head.

10. The method of claim 9 wherein said first layer comprises electroplated nickel-iron alloy.

11. The method of claim 10 wherein said gap forming layer comprises aluminum oxide.

12. A method of concurrently forming a thin film head and a lapping guide on a single substrate, said method comprising the steps of;

concurrently depositing a first layer of magnetic material onto said substrate to form a bottom pole piece comprising a front pole tip area and a back region area having a back gap portion for said head and to form a lower electrode having a contact tip and a back region area for said guide, depositing a gap forming layer of non-magnetic material over said first layer on said head and over said first layer on said guide with openings being placed in said gap forming layer of said guide and said head to allow an electrical contact to said contact tip of said first layer of said guide and to allow a magnetic contact to said back region area of said first layer of said head, depositing a first planarization layer over said back region area of said gap forming layer for the said guide and said head concurrently using a single masking step so that a registration inaccuracy can not cause relative mispositioning of a tip side edge of said planarization layer of said head and said guide, depositing only in said front pole tip area of said head a thin film magnetic layer on top of said gap forming layer for said head and concurrently depositing said thin film magnetic layer onto said lower contact tip for said guide to define an upper pole tip of said head and an upper electrical contact top of said guide, depositing on said head at least one layer containing coils over said planarization layer of said head, depositing at least one insulation layer over said coil layer of said head, and concurrently depositing over said planarization layer on said head and over said planarization layer on said guide an upper thin film layer of magnetic material to define an upper magnetic structure of said head and an electrical connection on said guide, said last named layer of said head contacting said upper pole tip layer only in an end portion of said upper pole tip layer adjacent to said back region area of said head.

* * * * *